(12) United States Patent
Ham et al.

(10) Patent No.: US 12,118,469 B2
(45) Date of Patent: Oct. 15, 2024

(54) PERSON RE-IDENTIFICATION DEVICE AND METHOD

(71) Applicant: INDUSTRY-ACADEMIC COOPERATION FOUNDATION, YONSEI UNIVERSITY, Seoul (KR)

(72) Inventors: Bum Sub Ham, Seoul (KR); Hyun Jong Park, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 466 days.

(21) Appl. No.: 17/667,462

(22) Filed: Feb. 8, 2022

(65) Prior Publication Data
US 2022/0165048 A1 May 26, 2022

Related U.S. Application Data

(63) Continuation of application No. PCT/KR2020/010753, filed on Aug. 13, 2020.

(30) Foreign Application Priority Data

Aug. 30, 2019 (KR) ........................ 10-2019-0107457

(51) Int. Cl.
*G06T 7/00* (2017.01)
*G06N 3/084* (2023.01)
(Continued)

(52) U.S. Cl.
CPC .............. *G06N 3/084* (2013.01); *G06T 7/97* (2017.01); *G06V 10/454* (2022.01); *G06V 10/50* (2022.01);
(Continued)

(58) Field of Classification Search
CPC ...... G06V 10/454; G06V 10/50; G06V 10/82; G06V 20/52; G06V 40/10; G06V 40/103;
(Continued)

(56) References Cited

U.S. PATENT DOCUMENTS

| 11,651,229 B2 * | 5/2023 | Cheng | G06F 18/23213 |
| | | | 382/118 |
| 2012/0288148 A1 * | 11/2012 | Suzuki | G06V 40/171 |
| | | | 382/103 |
| 2023/0290120 A1 * | 9/2023 | Zhao | G06N 3/04 |

FOREIGN PATENT DOCUMENTS

| JP | 2005-050285 A | 2/2005 |
| JP | 2017-142736 A | 8/2017 |

(Continued)

OTHER PUBLICATIONS

International Search Report & Written Opinion for PCT/KR2020/010753 dated Nov. 17, 2020.

*Primary Examiner* — Marcos L Torres

(57) ABSTRACT

A person re-identification device comprises: a feature extracting and dividing unit, that receives images including a person to be re-identified and extracts a feature of each image according to a pre-learned pattern estimation method to acquire a 3-dimensional feature vector, and divides the 3-dimensional feature vector into a pre-designated size unit to acquire local feature vectors; a one-to-many relational reasoning unit, that estimates the relationship between each of the local feature vectors and remaining local feature vectors, and reflects the estimated relationship to acquire local relational features; a global contrastive pooling unit, that acquires a global contrastive feature by performing global contrastive pooling; and a person re-identification unit, that receives the local relational features and the global contrastive feature as a final descriptor of a corresponding image, and compares the final descriptor with a reference (Continued)

descriptor acquired in advance from an image including a person to be searched.

10 Claims, 4 Drawing Sheets

(51) Int. Cl.
*G06V 10/44* (2022.01)
*G06V 10/50* (2022.01)
*G06V 10/82* (2022.01)
*G06V 20/52* (2022.01)
*G06V 40/10* (2022.01)

(52) U.S. Cl.
CPC .............. *G06V 10/82* (2022.01); *G06V 20/52* (2022.01); *G06V 40/10* (2022.01); *G06V 40/103* (2022.01); *G06V 10/457* (2022.01)

(58) Field of Classification Search
CPC .... G06V 10/457; G06V 10/469; G06N 3/084; G06N 3/045; G06T 7/97; G06F 18/22
See application file for complete search history.

(56) References Cited

FOREIGN PATENT DOCUMENTS

| | | | |
|---|---|---|---|
| JP | 2018-147392 | A | 9/2018 |
| KR | 10-2018-0086548 | A | 8/2018 |
| KR | 10-2019-0050639 | A | 5/2019 |

\* cited by examiner

PERSON RE-IDENTIFICATION DEVICE AND METHOD

CROSS-REFERENCE TO RELATED APPLICATIONS

This application is a continuation of pending PCT International Application No. PCT/KR2020/010753, which was filed on Aug. 13, 2020, and which claims priority from Korean Patent Application No. 10-2019-0107457 filed with the Korean Intellectual Property Office on Aug. 30, 2019. The entire contents of the aforementioned patent applications are incorporated herein by reference.

BACKGROUND

1. Technical Field

The present disclosure relates to a person re-identification device and method, more particularly to a person re-identification device and method capable of accurately re-identifying a person by using relational features between a plurality of local descriptors extracted from an image and features of the whole of the plurality of local descriptors together.

2. Description of the Related Art

Recently, research on person re-identification (referred to as reID), which searches for the same person photographed in different environments, has been actively conducted.

Person re-identification is a technique for detecting the same person photographed under different conditions, and the purpose is to accurately detect an image including the same person even when various environmental conditions change, such as changes in posture, changes in background, changes in lighting, and changes in shooting distance and angle.

This person re-identification technology can be used in various fields of searching and tracking a specific person in a plurality of images, such as searching for missing persons or searching for criminals.

However, for images photographed under variously changed environmental conditions as described above, it is difficult to re-identify even the same person. Accordingly, person re-identification is mainly studied in a method of extracting and comparing features of a person included in images using an artificial neural network.

In the past, studies have been mainly conducted to re-identify a person by extracting and comparing the overall features of an image, or to re-identify a person by extracting and comparing local features expressing the features of a person's body parts. Here, the technique of extracting and comparing local features enables strong re-identification of a person based on the features of each part even when a part of the body or important information is omitted from the image.

FIG. 1 is a diagram for explaining a concept of a person re-identification technique extracting local features.

Referring to FIG. 1, in the person re-identification technique extracting local features, when an image of W×H size is acquired as shown in (a), a plurality of feature maps are extracted as shown in (b) using a pre-learned artificial neural network. Then, by dividing and pooling the extracted feature maps with a pre-designated size as in (c), local feature vectors (g) in (d) are extracted. Then, by extracting features of the extracted local feature vectors (g) again, local features (h) in which the feature of the feature of the local feature vectors (g) is implied as shown in (e) are acquired. Then, by classifying the acquired local features, an identifier of the person included in the image is recognized as shown in (f).

As shown in FIG. 1, the local feature can provide a precise representation of a feature of a body part of a person. However, since it does not take into account the relationship between local features, i.e. the relationship between body parts, there is a limitation in that individual identity cannot be differentially expressed even when a plurality of local features are combined. In other words, there is a limitation in that it cannot express the overall features of a person. For this reason, there is a limitation in that misidentification of people frequently occurs when it is not easy to distinguish only with local features of the body, such as when different people are wearing the same type of clothing.

Accordingly, recently, attempts are being made to accurately re-identify a person based on the relationships between features of each part even when some body parts of a person are missing from the image, by using the relationship between local features together to consider the relationship between body parts.

SUMMARY

An object of the present disclosure is to provide a person re-identification device and method that can accurately re-identify a person from an image taken under various environmental conditions.

Another object of the present disclosure is to provide a person re-identification device and method capable of accurately re-identifying a person not only in an image where a part of the body is missing from the image, but also in an image that contains a person with similar characteristics for each part, by re-identifying a person based on the relationship between the local features for each part of the person included in the image and the difference between the maximum and average of the local features.

A person re-identification device according to an embodiment of the present disclosure, conceived to achieve the objectives above, comprises: a feature extracting and dividing unit, which receives a plurality of images including a person to be re-identified and extracts a feature of each image according to a pre-learned pattern estimation method to acquire a 3-dimensional feature vector, and divides it into a pre-designated size unit to acquire a plurality of local feature vectors; a one-to-many relational reasoning unit, which estimates the relationship between each of the plurality of local feature vectors and the remaining local feature vectors according to a pre-learned pattern estimation method, and reflects the estimated relationship to each of the plurality of local feature vectors to acquire a plurality of local relational features; a global contrastive pooling unit, which acquires a global contrastive feature by performing global contrastive pooling in which the relationship between the maximum feature and the average feature of the entire plurality of local feature vectors is reflected back to the maximum feature according to a pre-learned pattern estimation method; and a person re-identification unit, which receives the plurality of local relational features and the global contrastive feature as a final descriptor of a corresponding image, and compares it with a reference descriptor that is a final descriptor acquired in advance from an image including a person to be searched, thereby determining whether a person to be searched is included.

The one-to-many relational reasoning unit can acquire the plurality of local relational features, by concatenating an enhanced local feature acquired by sequentially extracting features for each of the plurality of local feature vectors and a rest part enhanced average feature acquired by extracting features for an average pooling result of the remaining local feature vectors from which features are not extracted, extracting features again for the concatenated rest part enhanced average feature, and then adding the corresponding enhanced local feature.

The one-to-many relational reasoning unit may include: a local feature extracting unit that selects one of the plurality of local feature vectors in a pre-designated order, and extracts features of the selected local feature vector according to a pre-learned pattern estimation method, thereby acquiring the enhanced local feature; a rest part average sampling unit that acquires a rest part average feature by performing average pooling on local feature vectors not selected by the local feature extracting unit among the plurality of local feature vectors; a rest part average feature extracting unit that acquires the rest part enhanced average feature by extracting a feature of the rest part average feature according to a pre-learned pattern estimation method; an enhanced local feature concatenating unit that concatenates the enhanced local feature and the rest part enhanced average feature to generate a concatenated local feature; a concatenated local feature extracting unit that acquires an enhanced concatenated local feature by extracting a feature of the concatenated local feature according to a pre-learned pattern estimation method; and a local relational feature acquiring unit that acquires a local relational feature corresponding to a selected local feature vector by adding the enhanced concatenated local feature and the enhanced local feature.

The global contrastive pooling unit may perform max pooling and average pooling on all of the plurality of local feature vectors, acquire an enhanced contrastive feature and an enhanced global maximum feature by extracting a feature of each of a global contrastive feature, which is a difference between a max pooling result and an average pooling result, and the max pooling result, extract a feature from the result of concatenating the enhanced contrastive feature and the enhanced global maximum feature, and then add the enhanced global maximum feature again, thereby acquiring the global contrastive feature.

The global contrastive pooling unit may include: a global max sampling unit that acquires a global maximum feature by performing global max pooling on all of the plurality of local feature vectors; a global average sampling unit that acquires a global average feature by performing global average pooling on all of the plurality of local feature vectors; a contrastive feature acquiring unit that acquires a contrastive feature by calculating the difference between the global maximum feature and the global average feature; an enhanced maximum feature extracting unit that acquires an enhanced global maximum feature by extracting a feature of the global maximum feature according to a pre-learned pattern estimation method; an enhanced contrastive feature extracting unit that acquires an enhanced contrastive feature by extracting a feature of the contrastive feature according to a pre-learned pattern estimation method; an enhanced global feature concatenating unit that generates a concatenated global feature by concatenating the enhanced global maximum feature and the enhanced contrastive feature; a concatenated global feature extracting unit that acquires an enhanced concatenated global feature by extracting a feature of the concatenated global feature according to a pre-learned pattern estimation method; and a global contrastive feature acquiring unit that acquires a global contrastive feature by adding the enhanced global maximum feature and the enhanced concatenated global feature.

The person re-identification device may further include a learning unit that receives a learning image labeled with an identifier at the time of learning, calculates triplet losses and cross-entropy losses from the difference between the identifier labeled in the learning image and the final descriptor acquired from the learning image to acquire a total loss, and backpropagates the acquired total loss.

A person re-identification method according to another embodiment of the present disclosure, conceived to achieve the objectives above, comprises the steps of: performing learning by receiving a plurality of learning images labeled with an identifier of a person included; acquiring a 3-dimensional feature vector by receiving a plurality of images including a person to be re-identified and extracting features of each image according to a pre-learned pattern estimation method; acquiring a plurality of local feature vectors by dividing the 3-dimensional feature vector into a pre-designated size unit; acquiring a plurality of local relational features by estimating the relationship between each of the plurality of local feature vectors and the remaining local feature vectors according to a pre-learned pattern estimation method and reflecting the estimated relationship to each of the plurality of local feature vectors; acquiring a global contrastive feature by performing global contrastive pooling in which the relationship between the maximum feature and the average feature of the entire plurality of local feature vectors is reflected back to the maximum feature according to a pre-learned pattern estimation method; and receiving the plurality of local relational features and the global contrastive feature as a final descriptor of a corresponding image, and comparing it with a reference descriptor that is a final descriptor acquired in advance from an image including a person to be searched, thereby determining whether a person to be searched is included.

Accordingly, the person re-identification device and method according to an embodiment of the present disclosure can acquire an enhanced local feature by using the relationships between local features of each part of a person included in an image, and extract contrastive features of all of the local features together on the basis of the difference between the maximum and average of the local features to re-identify the person, and thus can accurately re-identify a person in images in which part of the body is missing, as well as in images including a person having similar features in individual parts.

DETAILED DESCRIPTION

Figure 1:
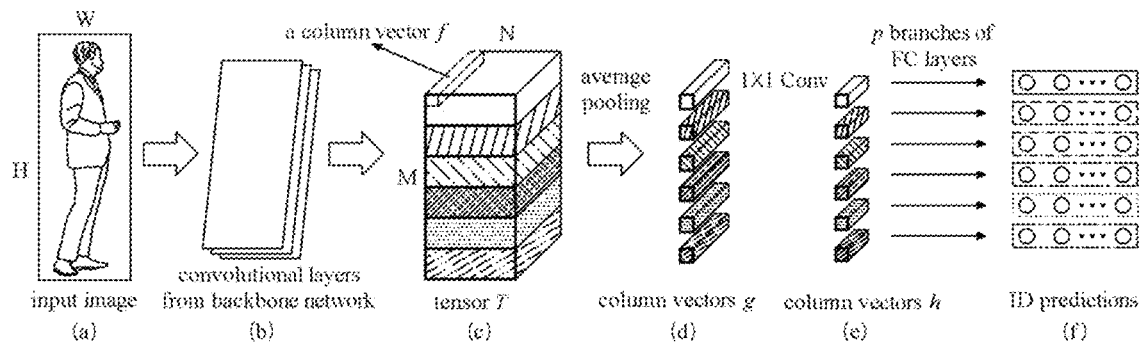
FIG. 1 is a diagram for explaining a concept of a person re-identification technique extracting local features.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
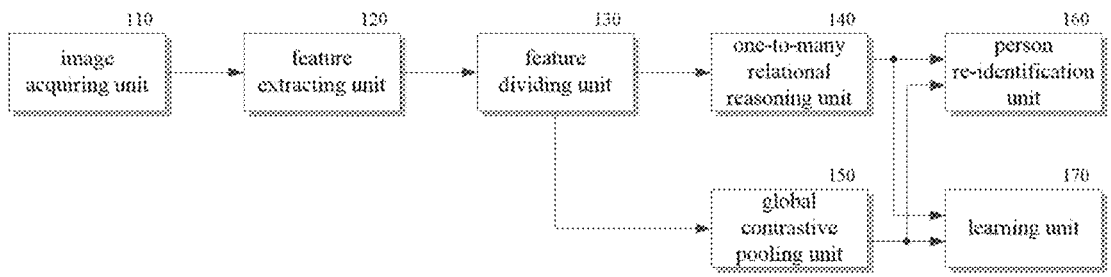
FIG. 2 shows a schematic structure of a person re-identification device according to an embodiment of the present disclosure.
Figure 3:
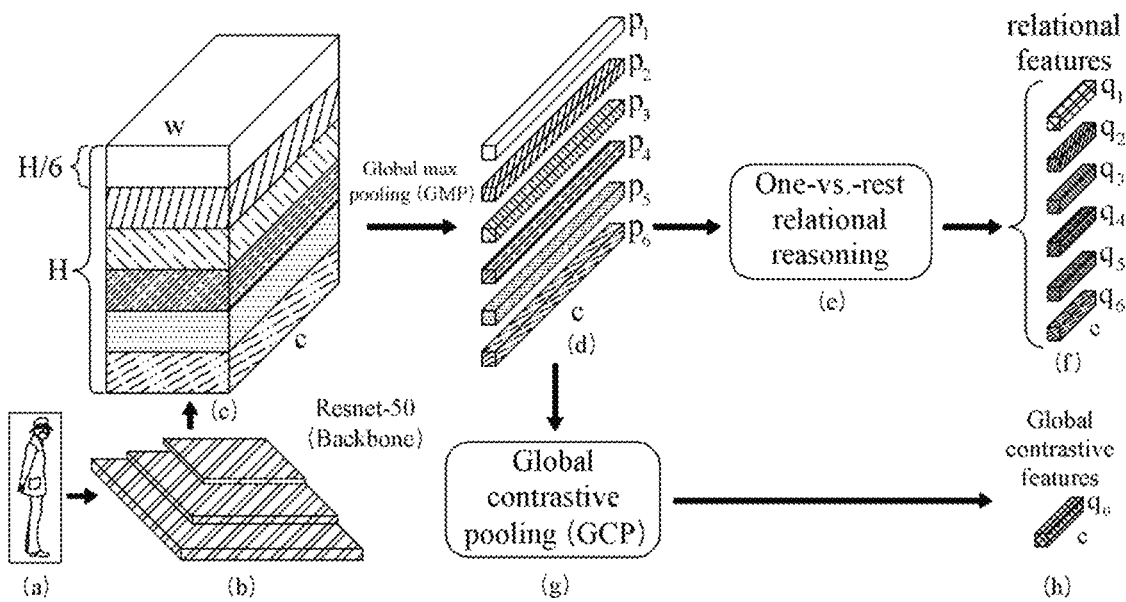
FIG. 3 is a diagram for explaining a concept in which the person re-identification device according to the present embodiment shown in FIG. 2 acquires a final descriptor.
Figure 4:
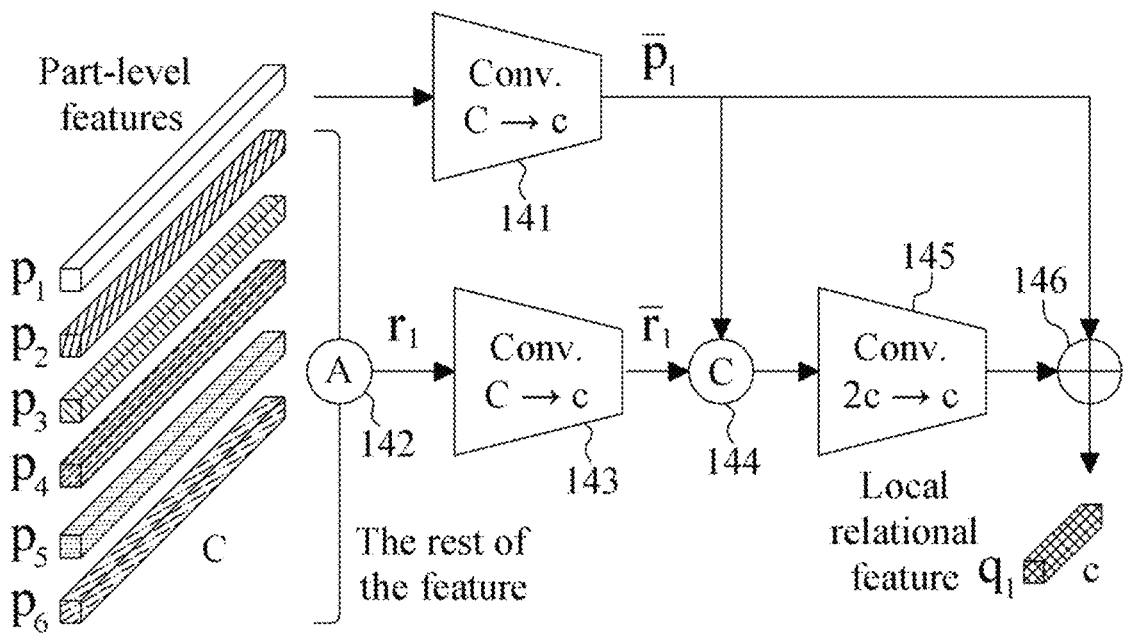
FIG. 4 shows an example of a detailed configuration of the one-to-many relational reasoning unit of FIG. 2.
Figure 5:
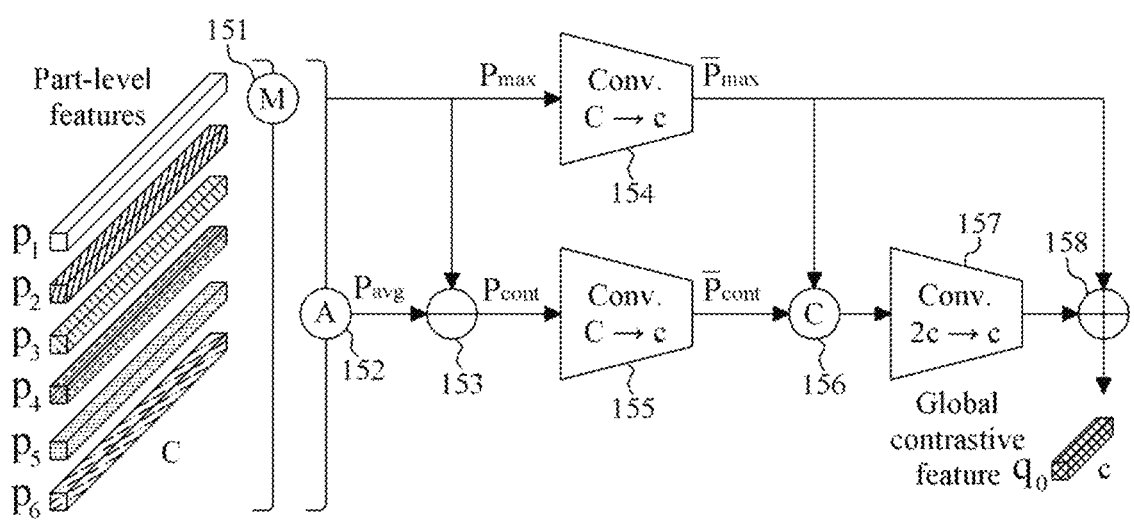
FIG. 5 shows an example of a detailed configuration of the global contrastive pooling unit of FIG. 2.

FIG. 2 shows a schematic structure of a person re-identification device according to an embodiment of the present disclosure, and FIG. 3 is a diagram for explaining a concept in which the person re-identification device according to the present embodiment shown in FIG. 2 acquires a final descriptor. FIG. 4 and FIG. 5 show an example of a detailed configuration of the one-to-many relational reasoning unit and the global contrastive pooling unit of FIG. 2.

Referring to FIG. 2, a person re-identification device according to the present embodiment may include an image acquiring unit 110, a feature extracting unit 120, a feature dividing unit 130, a one-to-many relational reasoning unit 140, a global contrastive pooling unit 150 and a person re-identification unit 160.

The image acquiring unit 110 acquires a plurality of images including a person to be re-identified as shown in (a) of FIG. 3. The image acquiring unit 110 may acquire a learning image from a database (not shown) in which a plurality of images are stored or an image acquiring device such as a camera, or may also acquire a learning image by receiving through an external device and network.

In addition, the image acquiring unit 110, when learning of the person re-identification device, may acquire a plurality of learning images in which identifiers of the included person are pre-labeled.

The feature extracting unit 120 is implemented as an artificial neural network in which a pattern estimation method has been learned in advance, and extracts a feature of the image received from the image acquiring unit 110, thereby acquiring a plurality of feature maps.

The feature extracting unit 120 may be learned together when learning of the person re-identification device, however since various artificial neural networks which acquire a feature map by extracting features from images have already been studied and disclosed, it may also acquire a feature map by using an artificial neural network previously learned and disclosed. Here, as an example, it is assumed that the feature extracting unit 120 uses ResNet-50, which is one of the artificial neural networks learned for image classification, as shown in (b) of FIG. 3.

The feature extracting unit 120 may acquire C feature maps of H×W size by extracting features from the received image. That is, it may acquire a 3-dimensional feature vector of H×W×C size.

The feature dividing unit 130 divides the 3-dimensional feature vector acquired by the feature extracting unit 120 into a pre-designated size unit, samples each of the divided plurality of feature vectors, and thus acquires a plurality of local feature vectors ($p_1$~$p_n$).

The feature dividing unit 130 may divide the 3-dimensional feature vector into various forms according to a pre-designated method, however, (c) of FIG. 3 illustrates, as an example, a case in which a 3-dimensional feature vector is divided into six according to a horizontal grid. The feature dividing unit 130 may sample in a global max pooling method, as shown in (d) of FIG. 3, for each of the six divided 3-dimensional vectors, and thus acquire six local feature vectors ($p_1$~$p_6$) each having a size of 1×1×C.

The plurality of local feature vectors ($p_1$~$p_n$) acquired by the feature dividing unit 130 are transmitted to each of the one-to-many relational reasoning unit 140 and the global contrastive pooling unit 150.

Here, the feature extracting unit 120 and the feature dividing unit 130 may be integrated into the feature extracting and dividing unit.

The one-to-many relational reasoning unit 140, which is shown as (e) in FIG. 3, receives a plurality of local feature vectors ($p_1$~$p_n$) from the feature dividing unit 130, and estimates the relationship between each of the received plurality of local feature vectors ($p_1$~$p_6$) and the remaining local feature vectors according to a pre-learned pattern estimation method, thereby enhancing such that the estimated relationship is reflected in the plurality of local feature vectors ($p_1$~$p_n$). The one-to-many relational reasoning unit 140 acquires a plurality of local relational features ($q_1$~$q_n$) that are enhanced local feature vectors, as shown in (f) of FIG. 3.

Here, the one-to-many relational reasoning unit 140 may acquire a plurality of local relational features ($q_1$~$q_n$) each having a size of 1×1×c (wherein, c≤C) from a plurality of local feature vectors ($p_1$~$p_n$) having a size of 1×1×C.

Referring to FIG. 4, the one-to-many relational reasoning unit 140 may include a local enhanced feature extracting unit 141, a rest part average sampling unit 142, a rest part average feature extracting unit 143, an enhanced local feature concatenating unit 144, a concatenated local feature extracting unit 145 and a local relational feature acquiring unit 146.

First, the local enhanced feature extracting unit 141 selects a plurality of local feature vectors ($p_1$~$p_n$) in a pre-designated order, and extracts features of the selected local feature vectors ($p_1$~$p_n$) according to a pre-learned pattern estimation method, thereby acquiring enhanced local features ($\overline{p_1}$~$\overline{p_n}$). Here, each of the enhanced local features ($\overline{p_1}$~$\overline{p_n}$) may have a size of 1×1×c.

Although in FIG. 4 it is illustrated on the assumption that the local enhanced feature extracting unit 141 selects a local feature vector ($p_1$) as an example, the local enhanced feature extracting unit 141 also selects the remaining unselected local feature vectors ($p_2$~$p_n$) according to a pre-designated order to acquire the enhanced local features ($\overline{p_1}$~$\overline{p_n}$).

While the local enhanced feature extracting unit 141 acquires each of the enhanced local features ($\overline{p_1}$~$\overline{p_n}$) by selecting one ($p_i$) from among a plurality of local feature vectors ($p_1$~$p_n$), the rest part average sampling unit 142 acquires a rest part average feature ($r_i$) by performing average pooling on the remaining local feature vectors ($p_2$~$p_n$) except for the local feature vector selected by the local enhanced feature extracting unit 141.

That is, the rest part average sampling unit 142 acquires the rest part average feature ($r_i$) according to Equation 1.

$$r_i = \frac{1}{n-1}\sum_{j\neq i} p_j \qquad \text{[Equation 1]}$$

(wherein, n is the number of local feature vectors, i is the index of local feature vector, and j is the index of local feature vector selected by the local enhanced feature extracting unit 141.)

The rest part average feature extracting unit 143 extracts a feature of the rest part average feature ($r_i$) according to a pre-learned pattern estimation method, thereby acquiring a rest part enhanced average feature ($\overline{r_i}$). While the local enhanced feature extracting unit 141 acquires the enhanced local features ($\overline{p_1} \sim \overline{p_n}$), the rest part average feature extracting unit 143 acquires corresponding rest part enhanced average feature ($\vec{r}$).

The enhanced local feature concatenating unit 144 concatenates the enhanced local features ($\overline{p_i}$) acquired by the local enhanced feature extracting unit 141 and the rest part enhanced average feature ($\overline{r_i}$), thereby generating concatenated local features. The concatenated local feature extracting unit 145 receives the concatenated local features, and extracts features of the concatenated local features according to the pre-learned pattern estimation method, thereby acquiring enhanced concatenated local features.

The local relational feature acquiring unit 146 acquires local relational features ($q_i$) by adding the enhanced local features ($\overline{p_i}$) acquired by the local enhanced feature extracting unit 141 and the enhanced concatenated local features.

That is, the one-to-many relational reasoning unit 140 concatenates a feature of each of a plurality of local feature vectors ($p_1 \sim p_n$) with the average feature of rest plurality of local feature vectors, thereby acquiring a plurality of local relational features ($q_1 \sim q_n$) including relationships between each local feature vectors ($p_1 \sim p_n$) and the rest local feature vectors.

A method in which the one-to-many relational reasoning unit 140 acquires a plurality of local relational features ($q_1 \sim q_n$) including relationships between each of a plurality of local feature vectors ($p_1 \sim p_n$) and the rest local feature vectors can be expressed as Equation 2.

$$q_i = \overline{p_i} + R_p(T(\overline{p_i}, \overline{r_i})) \qquad \text{[Equation 2]}$$

(wherein, T is a combining function representing the concatenation of features, and $R_p$ is a relational function mathematically expressing the concatenated local feature extracting unit 145 in which a pattern estimation method has been learned.)

Since the one-to-many relational reasoning unit 140 basically acquires a plurality of local relational features ($q_1 \sim q_n$) based on a plurality of local feature vectors ($p_1 \sim p_n$), it is possible to robustly extract features of a person even when a part of a person's body is missing or occlusion occurs due to being blocked from view.

In the one-to-many relational reasoning unit 140, each of the local enhanced feature extracting unit 141, the rest part average feature extracting unit 143 and the concatenated local feature extracting unit 145 may be implemented as a convolutional neural network, for example.

Meanwhile, the global contrastive pooling unit 150, which is shown as (g) in FIG. 3, receives a plurality of local feature vectors ($p_1 \sim p_n$) from the feature dividing unit 130 likewise the one-to-many relational reasoning unit 140, and performs global contrastive pooling to express the difference between the max sampling result and the average sampling result of all the received plurality of local feature vectors ($p_1 \sim p_n$) according to the pre-learned pattern estimation method. By performing global contrastive pooling, the global contrastive pooling unit 150 acquires one global contrastive feature ($q_0$), as shown in (h) of FIG. 3, from a plurality of local feature vectors ($p_1 \sim p_n$).

Here, the global contrastive pooling unit 150 may acquire one global contrastive feature ($q_0$) having a size of 1×1×c (wherein, c≤C) from a plurality of local feature vectors ($p_1 \sim p_n$) having a size of 1×1×C.

Referring to FIG. 5, the global contrastive pooling unit 150 may include a global max sampling unit 151, a global average sampling unit 152, a contrastive feature acquiring unit 153, an enhanced maximum feature extracting unit 154, an enhanced contrastive feature extracting unit 155, an enhanced global feature concatenating unit 156, a concatenated global feature extracting unit 157 and a global contrastive feature acquiring unit 158.

The global max sampling unit 151 acquires a global maximum feature ($p_{max}$) by performing global max pooling on all of the plurality of local feature vectors ($p_1 \sim p_n$). Meanwhile, the global average sampling unit 152 acquires a global average feature ($p_{avg}$) by performing global average pooling on all of the plurality of local feature vectors ($p_1 \sim p_n$).

The contrastive feature acquiring unit 153 acquires a contrastive feature ($p_{cont}$) by calculating the difference between the global maximum feature ($p_{max}$) and the global average feature ($p_{avg}$). That is, it acquires the contrastive feature ($p_{cont}$) by calculating the difference between the maximum value and the average value of the plurality of local feature vectors ($p_1 \sim p_n$).

The enhanced maximum feature extracting unit 154 receives the global maximum feature ($p_{max}$), and extracts a feature according to the pre-learned pattern estimation method, thereby acquiring an enhanced global maximum feature ($\overline{p_{max}}$). The enhanced contrastive feature extracting unit 155 receives the contrastive feature ($p_{cont}$), and extracts a feature according to the pre-learned pattern estimation method, thereby acquiring an enhanced contrastive feature ($\overline{p_{cont}}$).

The enhanced global feature concatenating unit 156 generates a concatenated global feature by concatenating the enhanced global maximum feature ($\overline{p_{max}}$) and the enhanced contrastive feature ($\overline{p_{cont}}$), and the concatenated global feature extracting unit 157 acquires an enhanced concatenated global feature by extracting a feature of the concatenated global feature according to a pre-learned pattern estimation method.

The global contrastive feature acquiring unit 158 acquires a global contrastive feature ($q_0$) by adding the enhanced global maximum feature ($\overline{p_{max}}$) acquired by the enhanced maximum feature extracting unit 154 and the enhanced concatenated global feature acquired by the concatenated global feature extracting unit 157.

A method, in which the global contrastive pooling unit 150 reflects the contrastive value representing the difference between the maximum value and the average value of the plurality of local feature vectors ($p_1 \sim p_n$) to the maximum value of the plurality of local feature vectors ($p_1 \sim p_n$) and thus acquires a global contrastive feature ($q_0$), can be expressed as Equation 3.

$$q_0 = \overline{p_{max}} + R_g(T(\overline{p_{max}}, \overline{p_{cont}})) \qquad \text{[Equation 3]}$$

(wherein, T is a combining function representing the concatenation of features, and $R_g$ is a relational function mathematically expressing the concatenated global feature extracting unit 157 in which a pattern estimation method has been learned.)

Regarding that the global contrastive pooling unit 150 acquires a global contrastive feature ($q_0$) on the basis of the relationship between the maximum value and the average value of a plurality of local feature vectors ($p_1 \sim p_n$), when max pooling is performed on a plurality of local feature vectors ($p_1 \sim p_n$), it has the advantage of being able to extract the most essential feature from the entire image, while the variety of features that can be expressed is limited. On the other hand, when average pooling is performed on a plurality of local feature vectors ($p_1 \sim p_n$), the proportion of unnecessary information being included in the feature increases.

Accordingly, the global contrastive pooling unit 150 according to the present embodiment applies contrastive pooling that adds the difference between max pooling and average pooling on a plurality of local feature vectors ($p_1 \sim p_n$) and the max pooling result, such that it is possible to increase the diversity of feature expression and at the same time prevent unnecessary information from being excessively included in the feature.

In the global contrastive pooling unit 150, each of the enhanced maximum feature extracting unit 154, the enhanced contrastive feature extracting unit 155 and the concatenated global feature extracting unit 157 may be implemented as a convolutional neural network, for example.

The person re-identification unit 160 receives a plurality of local relational features ($q_1 \sim q_n$) acquired by the one-to-many relational reasoning unit 140 and a global contrastive feature ($q_0$) as a final descriptor, and re-identifies a person included in the image using the received final descriptor ($q_0 \sim q_n$).

The person re-identification unit 160 may acquire and store in advance a reference descriptor that is a final descriptor ($q_0 \sim q_n$) for an image including a person to be searched, and then, when a final descriptor ($q_0 \sim q_n$) for a re-identification image, in which has to be determined whether or not a person to be searched is included, is acquired, may re-identify a person included in the re-identification image by analyzing the similarity between the final descriptor ($q_0 \sim q_n$) for the re-identification image and the reference presenter.

For example, the person re-identification unit 160, if the degree of similarity between the final descriptor ($q_0 \sim q_n$) and the reference descriptor is equal to or higher than a pre-designated reference degree of similarity, may determine that a person to be searched is included in the re-identification image, and, if it is lower than the reference degree of similarity, may determine that a person to be searched is not included.

Meanwhile, the person re-identification device according to the present embodiment may further include a learning unit 170. The learning unit 170 is a configuration for making the one-to-many relational reasoning unit 140 and the global contrastive pooling unit 150 learn, and may be omitted when learning is completed.

As described above, when learning of the person re-identification device, a plurality of learning image labeled in advance with a person's identifier are applied.

In this embodiment, the learning unit 170 may calculate the loss (L) as in Equation 4 based on the triplet loss ($L_{triplet}$) and the cross-entropy loss ($L_{ce}$), which are already known losses in the field of artificial neural networks.

$$\mathcal{L} = \mathcal{L}_{triplet} + \lambda \mathcal{L}_{ce} \qquad \text{[Equation 4]}$$

(wherein, $\lambda$ represents a loss weight.)

The cross-entropy loss ($L_{ce}$) in Equation 4 is defined by Equation 5.

$$\mathcal{L}_{ce} = -\sum_{n=1}^{N} \sum_{i} y^n \log \hat{y}_i^n \qquad \text{[Equation 5]}$$

(wherein, N denotes the number of images in a mini-batch, and $y^n$ denotes an identifier labeled in the learning image. In addition, $\hat{y}_i^n$ is an identifier predicted for the final descriptor ($q_i$) and is defined by Equation 6.)

$$\hat{y}_i^n = \underset{c \in K}{\mathrm{argmax}} \frac{\exp((w_i^c)^T q_i)}{\sum_{k=1}^{K} \exp((w_i^k)^T q_i)} \qquad \text{[Equation 6]}$$

(wherein, K is the number of identification labels, and $w_i^k$ denotes the final descriptor ($q_i$) and the classifier of the identification label (k).)

Meanwhile, triplet loss ($L_{triplet}$) is defined by Equation 7.

$$\mathcal{L}_{triplet} = \sum_{k=1}^{N_K} \sum_{m=1}^{N_M} \left[ \alpha + \max_{n=1...M} \|q_{k,m}^A - q_{k,n}^P\|_2 - \min_{\substack{l=1...K \\ n=1...N \\ l \neq k}} \|q_{k,m}^A - q_{l,n}^N\|_2 \right]_+ \qquad \text{[Equation 7]}$$

(wherein, $N_K$ is the number of identifiers in a mini-batch, and $N_M$ is the number of images for each identifier (wherein, $N=N_K N_M$), $\alpha$ is a margin variable that controls the distance between a pair of positive number and negative number in the feature space, wherein, $q^A_{i,j}$, $q^P_{i,j}$, and $q^N_{i,j}$ denote anchor, positive, and negative image person expression, respectively, and wherein, i, j denote an identifier and an image index.)

When the loss (L) is calculated according to Equations 4 to 7, the learning unit 170 may backpropagate the calculated loss to the one-to-many relational reasoning unit 140 and the global contrastive pooling unit 150, thereby making them learn.

Figure 6:
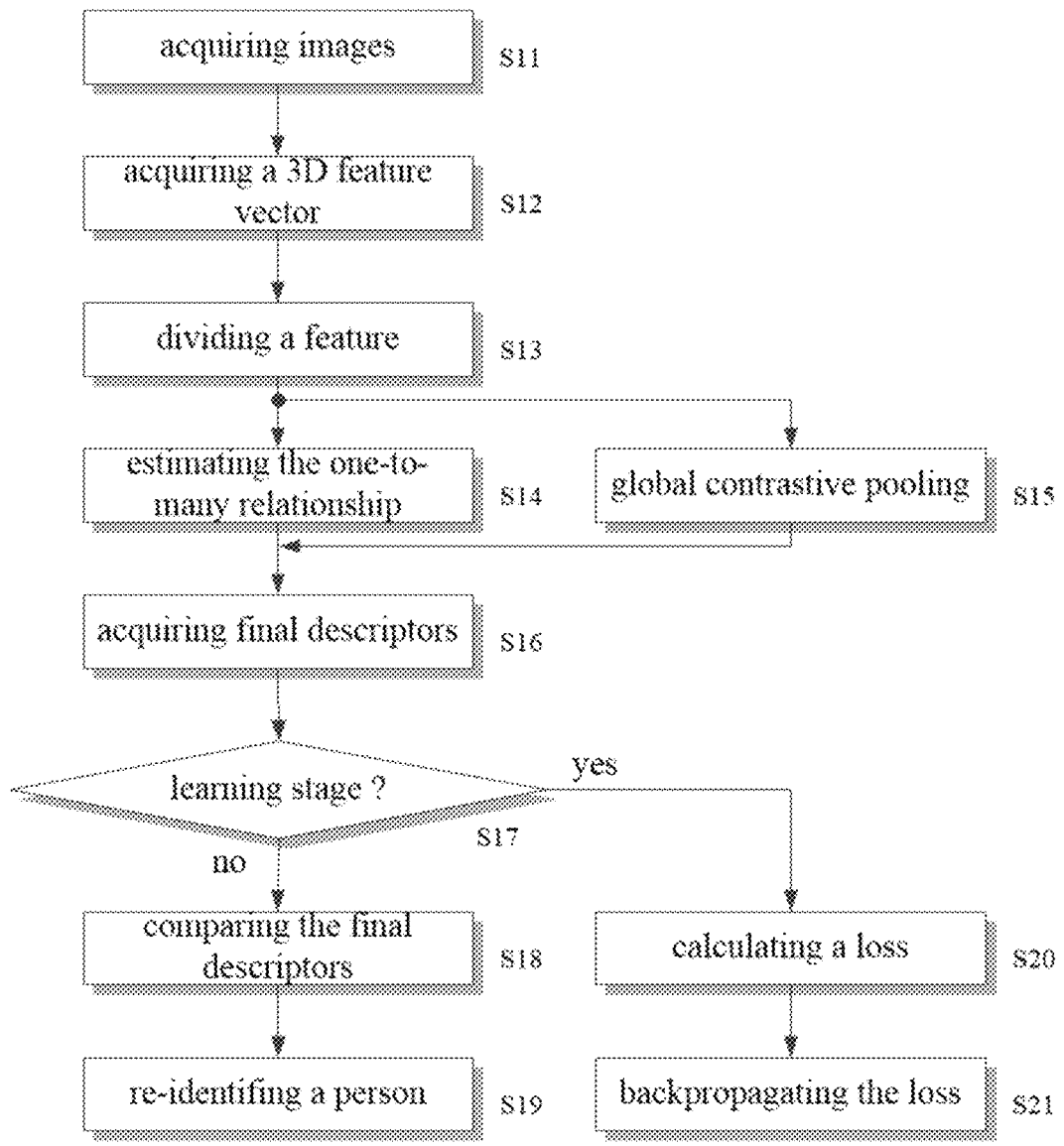
FIG. 6 shows a person re-identification method according to an embodiment of the present disclosure.

FIG. 6 shows a person re-identification method according to an embodiment of the present disclosure.

Referring to FIG. 2 to FIG. 5, the person re-identification method according to the present embodiment is described as follows. First, a plurality of images including a person to be re-identified are acquired (S11). However, in the case of a learning stage in which learning is performed, a plurality of learning images in which identifiers of an included person are pre-labeled are acquired.

Then, a 3D feature vector is acquired by extracting a feature from each of the acquired images according to a pre-learned pattern estimation method (S12). When the 3D feature vector is acquired, a plurality of local feature vectors ($p_1 \sim p_n$) are acquired by dividing the 3D feature vector into a pre-designated size unit (S13).

Thereafter, the relationship between each of the plurality of local feature vectors ($p_1 \sim p_n$) acquired according to the pre-learned method and the remaining local feature vectors is estimated, and a plurality of local relational features ($q_1 \sim q_n$) which are enhanced local feature vectors are acquired by reflecting the estimated relationship to each of the plurality of local feature vectors ($p_1 \sim p_n$) (S14).

The plurality of local relational features ($q_1 \sim q_n$) can be acquired by concatenating enhanced local features ($\overline{p_1} \sim \overline{p_n}$) acquired by sequentially extracting a feature for each of the plurality of local feature vectors ($p_1 \sim p_n$) and rest part enhanced average features ($\overline{r}_t$) acquired by extracting a feature for an average pooling result of the remaining local feature vectors from which a feature is not extracted, extracting a feature again, and then adding the corresponding enhanced local feature ($p_1 \sim p_n$).

In addition, a global contrastive feature ($q_0$) is acquired by performing global contrastive pooling in which the relationship between the maximum feature and the average feature of the entire plurality of local feature vectors ($p_1 \sim p_n$) acquired according to a pre-learned method is reflected back to the maximum feature (S15).

The global contrastive feature ($q_0$) can be acquired by performing max pooling and average pooling on all of the plurality of local feature vectors ($p_1 \sim p_n$), acquiring an enhanced contrastive feature ($\overline{p}_{cont}$) and an enhanced global maximum feature ($\overline{p}_{max}$) by extracting a feature of each of a global contrastive feature, which is the difference between the max pooling result and the average pooling result, and the max pooling result, extracting a feature from the result of concatenating the enhanced contrastive feature ($\overline{p}_{cont}$) and the enhanced global maximum feature ($\overline{p}_{max}$), and then add the enhanced global maximum feature ($\overline{p}_{max}$) again.

Then, the acquired global contrastive feature ($q_0$) and the plurality of local relational features ($q_1 \sim q_n$) are acquired as final descriptors ($q_0 \sim q_n$) (S16).

When the final descriptor for the acquired image is acquired, it is determined whether or not it is a learning stage (S17). If it is not a learning stage, the similarity is analyzed by comparing the acquired final descriptors ($q_0 \sim q_n$) with the reference descriptor, which is the final descriptor ($q_0 \sim q_n$) acquired in advance from an image including a person to be searched (S18).

Then, according to the similarity analysis result, it is determined whether or not the person to be searched is included in the acquired image to re-identify the person (S19).

On the other hand, if it is determined that it is a learning stage, the loss (L) is calculated according to Equations 4 to 7 using the acquired final descriptor ($q_0 \sim q_n$) and the identifier labeled in the learning image (S20). Then, learning is performed by backpropagating the calculated loss (S21).

A method according to the present disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM (random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A person re-identification device for re-identifying a person included in an image, the device performing learning by receiving a plurality of learning images labeled with an identifier of a person included, and comprising:
   a feature extracting and dividing unit, that receives a plurality of images including a person to be re-identified, extracts a feature of each image according to a pre-learned pattern estimation method to acquire a 3-dimensional feature vector, and divides the 3-dimensional feature vector into a pre-designated size unit to acquire a plurality of local feature vectors;
   a one-to-many relational reasoning unit, that estimates a relationship between each of the plurality of local feature vectors and remaining local feature vectors according to a pre-learned pattern estimation method, and reflects the estimated relationship to each of the plurality of local feature vectors to acquire a plurality of local relational features;
   a global contrastive pooling unit, that acquires a global contrastive feature by performing global contrastive pooling in which a relationship between a maximum feature and an average feature of the plurality of local feature vectors is reflected back to the maximum feature according to a pre-learned pattern estimation method; and
   a person re-identification unit, that receives the plurality of local relational features and the global contrastive feature as a final descriptor of a corresponding image, and compares the final descriptor with a reference descriptor that is a final descriptor acquired in advance from an image including a person to be searched, thereby determining whether a person to be searched is included.

2. The person re-identification device according to claim 1,
   wherein the one-to-many relational reasoning unit acquires the plurality of local relational features, by concatenating an enhanced local feature acquired by sequentially extracting features for each of the plurality of local feature vectors and a rest part enhanced average feature acquired by extracting features for an average pooling result of the remaining local feature vectors from which features are not extracted, extracting features again for the concatenated rest part enhanced average feature, and then adding the corresponding enhanced local feature.

3. The person re-identification device according to claim 2,
   wherein the one-to-many relational reasoning unit includes:
   a local feature extracting unit that selects one of the plurality of local feature vectors in a pre-designated order, and extracts a feature of the selected local feature vector according to a pre-learned pattern estimation method, thereby acquiring the enhanced local feature;
   a rest part average sampling unit that acquires a rest part average feature by performing average pooling on a local feature vector not selected by the local feature extracting unit among the plurality of local feature vectors;
   a rest part average feature extracting unit that acquires the rest part enhanced average feature by extracting a feature of the rest part average feature according to a pre-learned pattern estimation method;

an enhanced local feature concatenating unit that concatenates the enhanced local feature and the rest part enhanced average feature to generate a concatenated local feature;

a concatenated local feature extracting unit that acquires an enhanced concatenated local feature by extracting a feature of the concatenated local feature according to a pre-learned pattern estimation method; and a local relational feature acquiring unit that acquires a local relational feature corresponding to a selected local feature vector by adding the enhanced concatenated local feature and the enhanced local feature.

4. The person re-identification device according to claim 1, wherein the global contrastive pooling unit performs max pooling and average pooling on all of the plurality of local feature vectors, acquires an enhanced contrastive feature and an enhanced global maximum feature by extracting a feature of each of a global contrastive feature, which is a difference between a max pooling result and an average pooling result, and the max pooling result, extracts a feature from the result of concatenating the enhanced contrastive feature and the enhanced global maximum feature, and then add the enhanced global maximum feature again, thereby acquiring the global contrastive feature.

5. The person re-identification device according to claim 4, wherein the global contrastive pooling unit includes:

a global max sampling unit that acquires a global maximum feature by performing global max pooling on all of the plurality of local feature vectors;

a global average sampling unit that acquires a global average feature by performing global average pooling on all of the plurality of local feature vectors;

a contrastive feature acquiring unit that acquires a contrastive feature by calculating a difference between the global maximum feature and the global average feature;

an enhanced maximum feature extracting unit that acquires an enhanced global maximum feature by extracting a feature of the global maximum feature according to a pre-learned pattern estimation method;

an enhanced contrastive feature extracting unit that acquires an enhanced contrastive feature by extracting a feature of the contrastive feature according to a pre-learned pattern estimation method;

an enhanced global feature concatenating unit that generates a concatenated global feature by concatenating the enhanced global maximum feature and the enhanced contrastive feature;

a concatenated global feature extracting unit that acquires an enhanced concatenated global feature by extracting a feature of the concatenated global feature according to a pre-learned pattern estimation method; and a global contrastive feature acquiring unit that acquires a global contrastive feature by adding the enhanced global maximum feature and the enhanced concatenated global feature.

6. The person re-identification device according to claim 1, wherein the person re-identification device further includes a learning unit that receives a learning image labeled with an identifier at the time of learning, calculates triplet losses and cross-entropy losses from the difference between the identifier labeled in the learning image and the final descriptor acquired from the learning image to acquire a total loss, and back-propagates the acquired total loss.

7. A person re-identification method comprising the steps of:

performing learning by receiving a plurality of learning images labeled with an identifier of a person included;

acquiring a 3-dimensional feature vector by receiving a plurality of images including a person to be re-identified and extracting a feature of each image according to a pre-learned pattern estimation method;

acquiring a plurality of local feature vectors by dividing the 3-dimensional feature vector into a pre-designated size unit;

acquiring a plurality of local relational features by estimating a relationship between each of the plurality of local feature vectors and remaining local feature vectors according to a pre-learned pattern estimation method and reflecting the estimated relationship to each of the plurality of local feature vectors;

acquiring a global contrastive feature by performing global contrastive pooling in which a relationship between a maximum feature and an average feature of the entire plurality of local feature vectors is reflected back to the maximum feature according to a pre-learned pattern estimation method; and receiving the plurality of local relational features and the global contrastive feature as a final descriptor of a corresponding image, and comparing the final descriptor with a reference descriptor that is a final descriptor acquired in advance from an image including a person to be searched, thereby determining whether the person to be searched is included.

8. The person re-identification method according to claim 7, wherein the step of acquiring the plurality of local relational features includes the steps of:

selecting one of the plurality of local feature vectors in a pre-designated order, and extracting a feature of the selected local feature vector according to a pre-learned pattern estimation method, thereby acquiring an enhanced local feature;

acquiring a rest part average feature by performing average pooling on a local feature vector not selected among the plurality of local feature vectors;

acquiring a rest part enhanced average feature by extracting a feature of the rest part average feature according to a pre-learned pattern estimation method;

concatenating the enhanced local feature and the rest part enhanced average feature to generate a concatenated local feature;

acquiring an enhanced concatenated local feature by extracting a feature of the concatenated local feature according to a pre-learned pattern estimation method; and acquiring a local relational feature corresponding to a selected local feature vector by adding the enhanced concatenated local feature and the enhanced local feature.

9. The person re-identification method according to claim 7, wherein the step of acquiring the global contrastive feature includes the steps of:

acquiring a global maximum feature by performing global max pooling on all of the plurality of local feature vectors;

acquiring a global average feature by performing global average pooling on all of the plurality of local feature vectors;

acquiring a contrastive feature by calculating a difference between the global maximum feature and the global average feature;

acquiring an enhanced global maximum feature by extracting a feature of the global maximum feature according to a pre-learned pattern estimation method;

acquiring an enhanced contrastive feature by extracting a feature of the contrastive feature according to a pre-learned pattern estimation method;

generating a concatenated global feature by concatenating the enhanced global maximum feature and the enhanced contrastive feature;

acquiring an enhanced concatenated global feature by extracting a feature of the concatenated global feature according to a pre-learned pattern estimation method; and acquiring the global contrastive feature by adding the enhanced global maximum feature and the enhanced concatenated global feature.

10. The person re-identification method according to claim 7, wherein the step of performing the learning includes the steps of:

receiving a learning image labeled with an identifier;

acquiring a final descriptor for the learning image;

calculating triplet losses and cross-entropy losses from difference between the identifier labeled in the learning image and the final descriptor acquired from the learning image to acquire a total loss; and backpropagating the acquired total loss.

* * * * *